Jan. 17, 1933. H. W. FENDER 1,894,371
ACIDPROOF TANK
Filed Aug. 1, 1928 3 Sheets-Sheet 1

H. W. Fender
INVENTOR

Jan. 17, 1933.    H. W. FENDER    1,894,371
ACIDPROOF TANK
Filed Aug. 1, 1928    3 Sheets-Sheet 2

H. W. Fender
INVENTOR

By: Mark & Clem
Att'ys.

Jan. 17, 1933.  H. W. FENDER  1,894,371
ACIDPROOF TANK
Filed Aug. 1, 1928  3 Sheets-Sheet 3

H. W. Fender
INVENTOR

By Marks & Clerk
Attys.

Patented Jan. 17, 1933

1,894,371

UNITED STATES PATENT OFFICE

HAROLD WILLIAM FENDER, OF WEDNESBURY, ENGLAND, ASSIGNOR TO PRODORITE, S. A., OF GENEVA, SWITZERLAND

ACIDPROOF TANK

Application filed August 1, 1928, Serial No. 296,841, and in Great Britain August 22, 1927.

This invention relates to acid-proof and other tanks. It includes tanks for holding acids or other corrosive liquids, or for holding liquids which are neither acid nor corrosive, and may be alkaline or neutral. It also includes tanks of all kinds, suitable for holding solid, liquid or gaseous bodies, whether acid, alkaline or neutral. It may be applied to the making of lining of acid and other containers, process tanks or vats and sumps as well as to such diverse tanks as electrical net work pits.

The object of the invention is to provide improved constructions of tanks particularly suitable for the above purposes.

The invention in brief consists in a method of forming a tank in which there is provided an outer container of sufficient mechanical strength but not necessarily inert or resistant to acids or the like, the inner lining for the aforesaid container being composed of suitably inert bricks or blocks provided with a dovetail undercut or like back and spaced away from the outer container and an intermediate layer of cement or like substance which though substantially solid when cold may be poured when hot and is so poured to form a continuous inert layer between the inner lining of the bricks or blocks and the outer vessel.

The invention also consists in methods of constructing tanks substantially as herein described and in tanks substantially as herein described.

Referring to the accompanying diagrammatic drawings:—

Figure 1 is an isometric view of a brick formed in accordance with one construction according to the present invention, and Figure 2 is a modified form.

Figure 3 indicates a dovetail joint between two blocks with flat contiguous faces.

Figure 1:
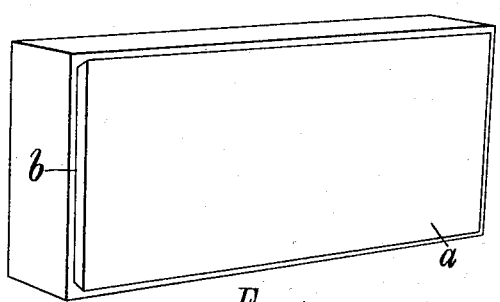

In carrying the invention into effect, in the form shown in Figure 1 by way of example, a brick $a$, suitable for instance for a lining of a tank, is composed of material according to British Letters Patent No. 201,650. This brick has on its back a continuous dovetail recess $b$.

Figure 2:
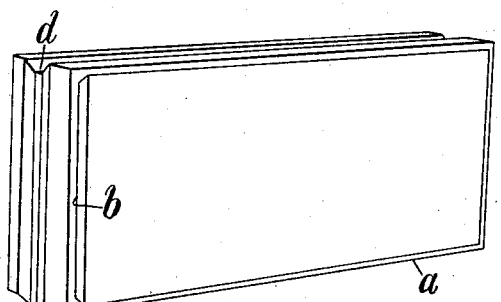

In the form shown in Figure 2, the brick $a$ is also provided with an edge key $c$ on two sides and one the other two sides with an edge keyway $d$, suitable for the reception of the keys $c$ of adjacent bricks the principal function of these keys and keyways being to maintain accurate register of the bricks or block forming for example the inner lining of a tank in all conditions of use.

Figure 3:
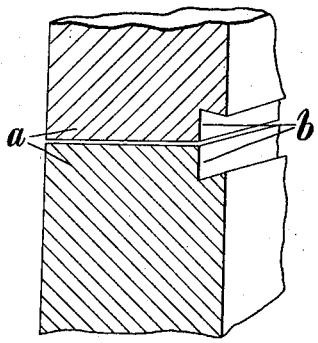

In Figure 3 is shown the laying together of two bricks $a$ with the lower part of the groove $b$ in the top brick, adjacent to the upper part of the groove $b$ in the lower brick, for purposes which will be referred to below with reference to Figure 5.

Figure 4:
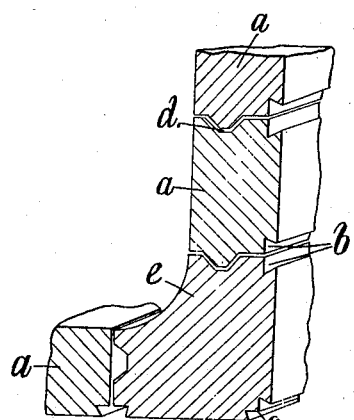
Figure 4 shows a modified form of Figure 3, in which blocks are provided with broken or keyed edges, and includes a corner joint.

In Figure 4, three bricks $a$ are assembled, as in Figure 3, together with a corner brick $e$ which is also provided with dovetail grooving $b$, and, as shown, is provided with dovetail grooves at the corner $f$. The bricks shown in Figure 4 are of the nature of those illustrated in Figure 2, in that keyways $d$ with cooperating keys are employed.

Figure 5:
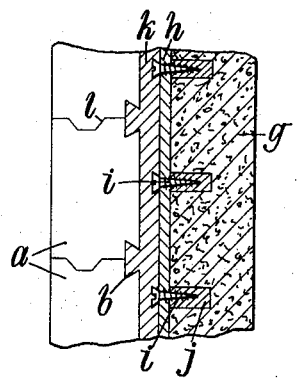
Figure 5 is a section of the wall of a vessel showing lining, keying compound and outer container.

In Figure 5 there is shown an assemblage of bricks $a$ similar to the illustration Figure 4, applied in the lining of an outer container $g$, made for example of concrete, brick or wood. Between the container $g$ and the bricks $a$ there is provided re-inforcing or protecting material $h$, which may be of expanded metal and felt, held to the container $g$ by means of screws $i$ in suitably filled holes $j$. The screws are permitted to project somewhat above the reinforcement $h$. After assembly, a jointing composition in suitable form is introduced into the space formed by the dovetailed grooves $b$ and the space left in assembly between the reinforcement $h$ and the bricks $a$. By this means, a solid homogeneous sheet $k$, for example, of acid-proof compound, is provided, firmly fixed to the lining bricks $a$, and to the outer container $g$. A jointing material may be provided in the junction between adjacent bricks $a$, for example at $l$.

Figure 6:
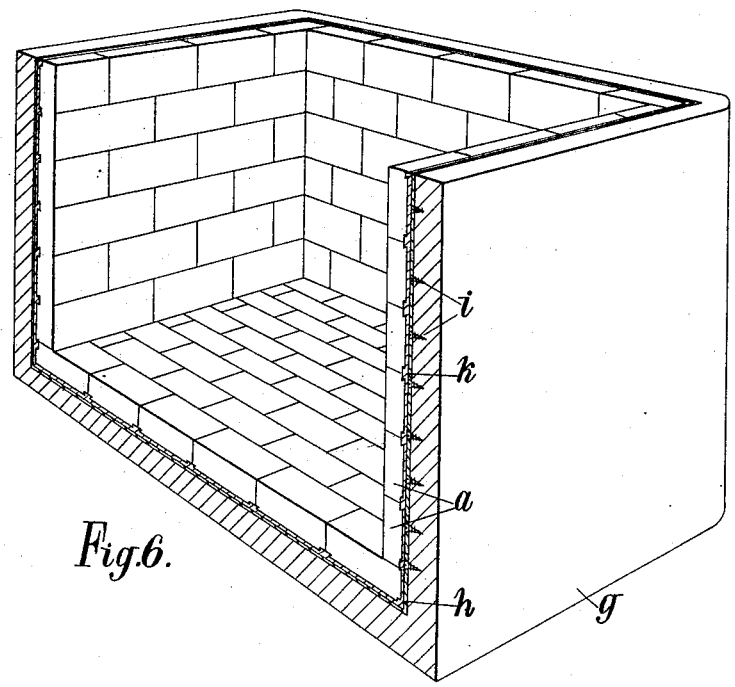
Figure 6 is an isometric projection of a tank made in accordance with one form of the present invention, part being removed for clearness.

In Figure 6, as explained above, there is shown a vessel lined with bricks in accordance with Figure 5, parts being omitted for clearness, and the bricks drawn as those of Figure 1 rather than those of Figure 2.

Figure 7:
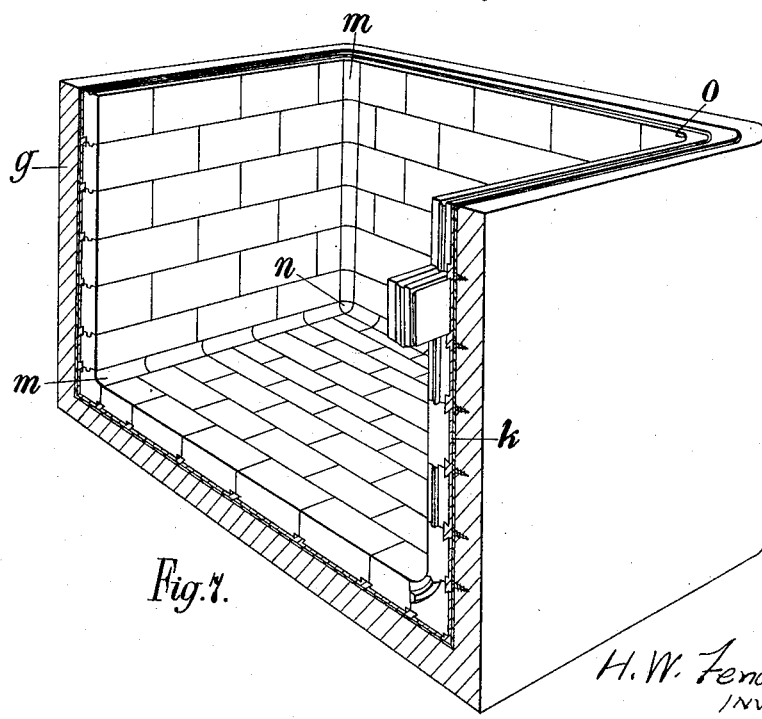
Figure 7 is a similar view of a modification.

In Figure 7, the bricks illustrated are similar to those of Figure 2, and in addition, special corner bricks $m$ are provided with a special corner junction brick $n$.

Figure 8:
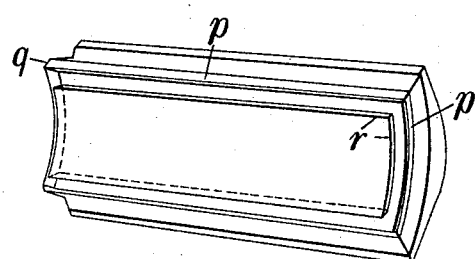
Figure 8 is an illustration of a form of brick or block suitable for covering the outside of a corner of a tank.

The outside corner bricks may conveniently be of the form shown in Figure 8. The brick shown in Figure 8 is provided with a dovetail groove $r$, key $q$, and keyways $p$.

Figure 9:
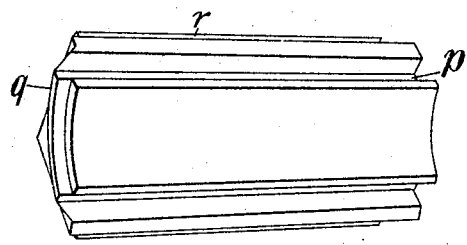
Figure 9 is an illustration of a form of brick or block suitable for covering the inside of a tank.

As an inner corner brick that shown in Figure 9 may be used. This brick is provided with a dovetail groove $r$, keys $q$ and keyways $p$.

Figure 10:
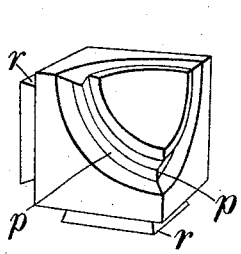
Figure 10 shows a form of junction brick or block suitable for covering the inside of the base corners of a tank.

The inner junction corner bricks $n$ may be made as shown in Figure 10. The brick shown in that drawing has a dovetail groove $r$ and keyways $p$.

Figure 11:
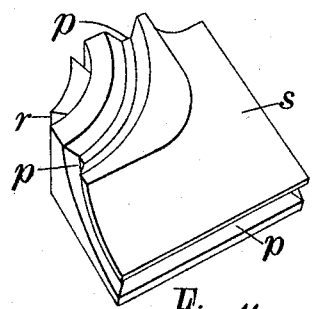
Figure 11 represents a form of brick or block suitable for covering the outside of a junction such as may be formed at the base of a buttress projecting into a tank.

The outside corner brick shown in Figure 11 may be employed, this having a dovetail groove $r$, and a curved portion $s$. It is also provided with keyways $p$ the shape of the dovetail groove, key and keyways, being suitably chosen having regard to the parts with which the bricks are to fit.

In building up a tank according to the present invention in one way, the first operation is to tap small holes $j$ at definite points, say six inches apart, in the inner face of an outer container $g$. Into these holes are inserted fibre tubes, and into these tubes are screws $i$ with large heads are fixed, the action being to make the screw hold firmly in the concrete. The screws $i$ are finally left with the heads alone protruding from the concrete.

When the screws have been inserted all round the walls and floor of the concrete container the floor of the container is flooded with heated acid-proof compound which is of a fluid nature when made very hot, so that it can be easily poured.

The next step is to take a number of special bricks as already described, and build them with the recessed part towards the flooded concrete floor, but a space should be left between each brick of about a quarter of an inch. The next operation is to pour hot acid-proof compound between all these bricks in such a way that it fills up all the spaces and keys on to the already flooded bottom. A tight covering has now been placed all over the bottom, but it should be noted that in construction such as Figure 6 where the bricks come against the upright walls a space of about half an inch should be allowed so that the proper forming of the joint can be continued up the sides of the container. The walls are now built up one course of bricks all round the structure at a time, leaving a small gap between the bricks and the container, and after placing each course hot acid-proof compound must be poured between the bricks and the outer container.

The cross joints when building the bricks up the walls, i. e. the face joints, should be caulked or the bricks set as they are built up in a very good silicate or other suitable cement applied as a very thin joint. This gives a finish to the lining, and also facilitates the building of the tank.

Modifications may be made in the arrangements or forms described above. For example, the keys $c$ and $q$ and keyways $d$ and $p$ may be disposed closer to one face of the brick than to the other. It may be noted that the purpose of the employment of the key and the keyway is to enable the bricks readily to be assembled and to maintain accurate register of the bricks or blocks forming the inner lining in all conditions of use.

The function of the employment of the keys and keyways closer to the face of the brick than to the back of the brick is to permit any suitable jointing material which may be placed between courses to be extruded from the face of the brick where it can be readily removed, but only slightly extruded into the dovetails which are at the back of the brick, one-half of which is at the bottom of any given brick, the other half being at the top of the adjacent brick.

The joints between adjacent faces of the vertical walls and the joints between the vertical walls and the base are formed by means of special edge bricks, curved at the part which will form part of the inner surface of the vessel and provided with locating keys and keyways on the edges abutting against the jointing surfaces.

The bricks are provided with dovetails or keyways at the back or at the base to suit the other dovetails or keyways of the tanks or as may be desired.

The four corners at the base of tank lining are provided with corner pieces somewhat similar to the edge pieces referred to above, but suitably curved so that each corner piece fits in appropriately with the two adjacent base edge pieces and the vertical edge piece. If desired, the blocks may also be formed with keyways or projections at their ends.

Where reference has been made above to the use of expanded metal and felt, the latter may be provided by sheets of felt, or may be substituted by asbestos paper or the like. The expanded metal should be so arranged that the jointing composition has access to it, and if desired the felt or the like may be omitted.

The uses to which vessels according to the present invention may be put include both high temperature and low temperature work.

In the case say of a pickling vessel, in which the temperature of use may be about 55° C., the jointing composition may conveniently be made from bitumen and a fine mineral powder.

A suitable composition is as follows:—

|  | Per cent |
|---|---|
| Bitumen | 40 |
| Powder | 60 |

The powder is preferably graded, and it is desirable that it should contain a substantial proportion of very fine powder, for example about 70 per cent. to 75 per cent. of a powder passing a sieve having about 200 meshes per linear inch.

The present invention may be employed in those cases referred to above, or for other tanks, and these may be used either for containing liquids or for containing solids, or gases whether these be acid, alkaline or neutral. The temperature of use may be as previously stated, or may be different, for example higher.

In those cases where expanded metal has been described above, this metal may be avoided or omitted.

According to a modification, the bottom bricks may have a complete groove all the way round the edges. Further, especially in the case of lining the outside of tanks, modified corner bricks may be used, these having special interlocking projections and grooves. Different bricks, suitably shaped, are preferably employed for bottom corners, and for side or edge joints. Where necessary, suitable keys and keyways are used, with the object of preventing creeping of the lining. The invention is particularly useful in the lining of acid containers, process tanks or vats and sumps, but is not limited thereto and may be used for other purposes for instance as indicated above.

Further, where reference has been made to acid-proof vessels, this includes vessels proof against alkalis or against liquids or against gases or other materials as may in any particular case be required or desired.

Further, the word "bricks" imports "blocks" and vice versa.

I claim:

1. An acid-proof tank construction, comprising an outer container, an inner lining of inert bricks suitably spaced from said container and provided with projections of height less than the width of the aforesaid spacing, said space having placed therein a reinforcing material and a filler between said container and said lining.

2. An acid-proof tank construction, comprising an outer container, an inner lining of inert bricks suitably spaced from said container and provided with projections of height less than the width of the aforesaid spacing, and a filler between said container and said inner lining, said filler consisting of inert material which is substantially solid when cold but may be poured when hot and contains a mineral powder.

3. An acid-proof tank construction, comprising an outer container, an inner lining of inert bricks suitably spaced from said container and provided with projections of height less than the width of the aforesaid spacing, and a filler between said container and said inner lining, said filler consisting of a mixture of about 40% bitumen and 60% fine mineral powder.

4. An acid-proof tank construction, comprising an outer container, an inner lining of inert bricks suitably spaced from said container and provided with projections of height less than the width of the aforesaid spacing, and a filler between said container and said inner lining, said filler consisting of a mixture of about 40% bitumen and 60% fine mineral powder of which powder 75% is sufficiently fine to pass through a sieve of mesh 200 per linear inch.

5. An acid-proof tank construction comprising an outer container of sufficient mechanical strength, but not necessarily acid-proof, an inner lining for said container composed of inert bricks provided with a dovetail shaped back, said bricks being provided with a continuous groove around the four sides and being spaced away from the outer container, an intermediate continuous layer of a cement which is substantially solid when cold but fluid when hot.

In testimony whereof I have signed my name to this specification.

HAROLD WILLIAM FENDER.